Nov. 10, 1970   S. M. MAX ET AL   3,539,860
VECTOR GENERATOR

Filed April 1, 1969   7 Sheets-Sheet 1

INVENTORS
SOLOMON M. MAX
JOHN B. PORTER
BY
Denway Jenney & Hildreth

ATTORNEYS

INVENTORS
SOLOMON M. MAX
JOHN B. PORTER
BY
Kenway Jenney & Hildreth
ATTORNEYS

Nov. 10, 1970  S. M. MAX ET AL  3,539,860
VECTOR GENERATOR

Filed April 1, 1969  7 Sheets-Sheet 6

INVENTORS
SOLOMON M. MAX
JOHN B. PORTER
BY
Kenway Jenney & Hildreth
ATTORNEYS

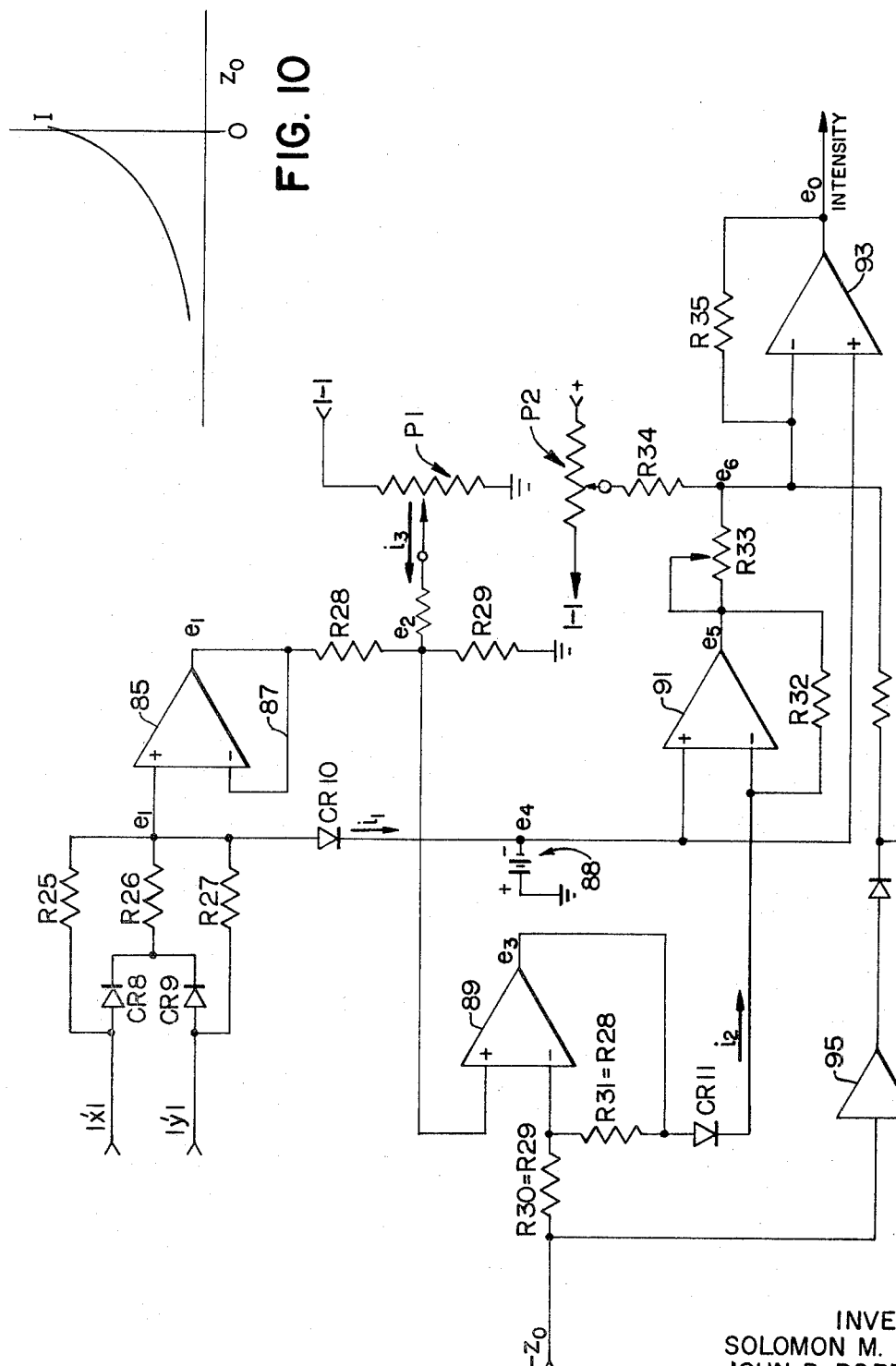

United States Patent Office 3,539,860
Patented Nov. 10, 1970

3,539,860
VECTOR GENERATOR
Solomon M. Max, Brookline, and John B. Porter, Wellesley Hills, Mass., assignors to Adage, Inc., Boston, Mass., a corporation of Massachusetts
Filed Apr. 1, 1969, Ser. No. 812,218
Int. Cl. H01j 29/52, 29/72
U.S. Cl. 315—22                     25 Claims

ABSTRACT OF THE DISCLOSURE

Apparatus for transforming a series of digital coordinates X, Y and Z into a display on a cathode ray tube in which each set of digital values is converted to a set of analog values and presented on the tube as a visible or invisible trace proportional in length to $\sqrt{X^2+Y^2}$, with the visible traces having an intensity determined by Z. The length of the vectors that are visibly presented determines the rate at which the electron beam is moved so that the intensity of the visible trace is relatively independent of the length of the trace but is determined by Z.

---

Our invention relates to information processing, and particularly to a novel display system for presenting digital data in graphic form.

Great progress has been made recently in the development of data processing apparatus capable of performing elaborate transformations on applied information signals in increasingly shorter times. To make use of the full capabilities of such data processing apparatus, it is necessary to present the results to the user of the apparatus in a manner that is as condensed and informative as possible Where processed data is in the form of a list of sets of coordinates which together approximately define a function of several variables over a region of interest, a pictorial representation of the data in the form of a visual graph of the function is frequently the most useful manner in which it can be displayed. For example, a three dimensional object may be defined in this manner as a list of sets of spatial coordinates which, if plotted in an appropriate region and connected by lines, would suggest the appearance of the object. It is highly desirable to present such a list as a visual graph of the object, and to do so with sufficient speed so that it is practical to change the display at a convenient visual frame rate. For example, using present computer techniques it is practical to successively apply coordinate transformations to a list of coordinate sets defining a function. If such a list can be displayed as a graph of the function it represents once each time a transformation is applied, a visual display that will comprise a graph of the function, such as the outline of an object, can be made to move about, to show the object from various points of view. That is a facility of value for many purposes, and especially in engineering design. The objects of our invention are to facilitate the display of function of as many as three variables, and particularly to improve the realism with which a three-dimensional display of an object can be presented.

Briefly, the above and other objects of our invention are attained by means of a novel display system adapted to cooperate with a computer. The display system includes a vector generator and a display unit, such as a cathode ray tube. The vector generator responds to each of a series of sets of coordinate values supplied by the computer for actuating the display unit to produce a series of pictorial vectors. A set of such drawn vectors represents a particular graph of the function of interest and constitutes a frame. We have found it practical to display such frames, each consisting of about 1000 vectors, at a frame rate of 30 frames per second. That would imply an average drawing rate per vector of 30 microseconds, although it is practical to draw many vectors in considerably less than 30 microseconds. In fact, a feature of our invention is the control of the time over which each vector is drawn so that the apparent brightness of the display on the cathode ray tube is approximately independent of the length of the vector drawn. Another significant feature is provision for the control of the intensity of a line drawn on the screen in dependence on one of the variables defining the function. Thus, in one practical embodiment of the invention to be described, a set of coordinates X, Y and Z are presented to the vector generator. The coordinates X and Y are used to control the horizontal and vertical displacements of the beam on the cathode ray tube, and the Z coordinate is used to modulate the intensity. In this manner, a vivid presentation of a three-dimensional object may be produced.

Each set of coordinates supplied to the vector generator defines the end point of a vector whose starting point is defined by the previous set. Provision is made for interrogating each set of coordinate supplied to the vector generator prior to displaying the vector drawn to the new end point, and for determining from their values the appropriate drawing time for the vector so that the drawing rate will be approximately constant. Preferably, additional means are provided for improving the approximation to uniform intensity at a constant value of Z by modulating the intensity in accordance with a function that approximates the actual writing speed. This intensity signal is preferably further modulated in accordance with the Z coordinate to introduce depth cueing into the display and thereby provide a simulated three dimensional display. An additional depth cue is provided by blanking the picture when Z is in front of the viewing screen. This, in effect, passes a blanking plane through a displayed object.

The apparatus of our invention, and its mode of operation, will best be understood in the light of the following detailed description, together with the accompanying drawings, of a preferred embodiment thereof.

Figure 5:
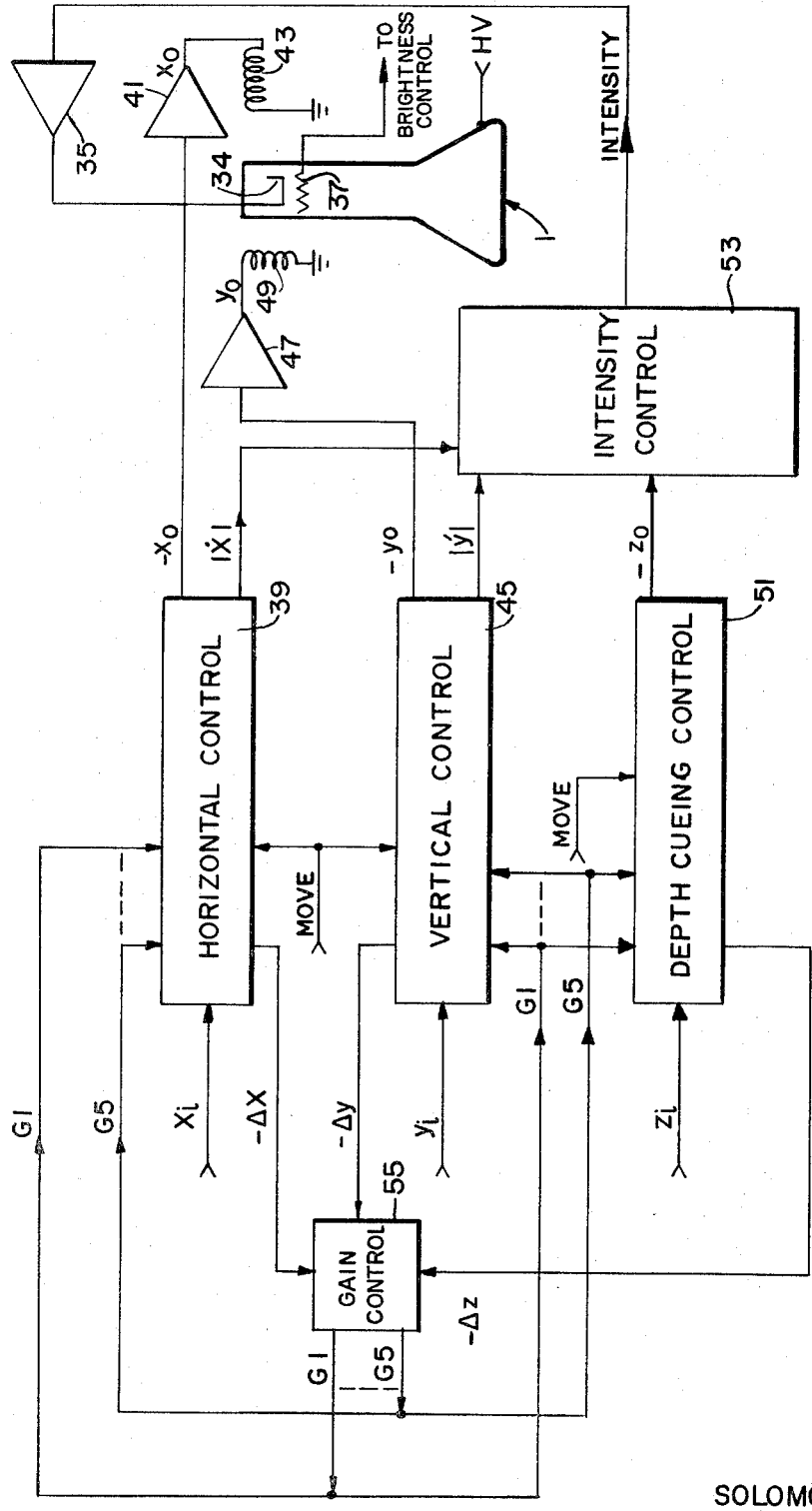
FIG. 5 is a block diagram of the vector generator and display unit forming a portion of the apparatus of FIG. 2.
Figure 7:
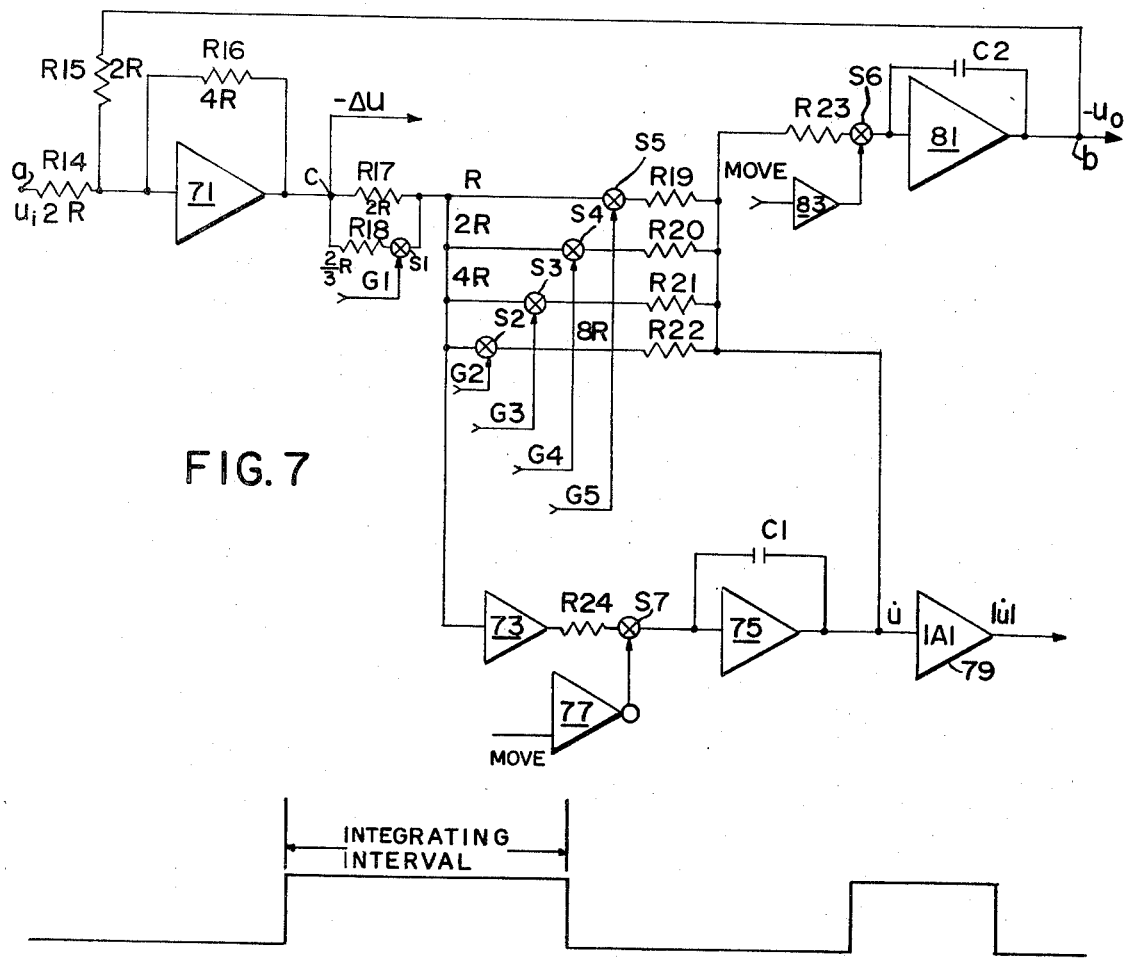
FIG. 7 is a schematic wiring diagram of apparatus suitable for use as the horizontal control, the vertical control or the depth cueing control, each forming part of the apparatus of FIG. 5.
Figure 8:
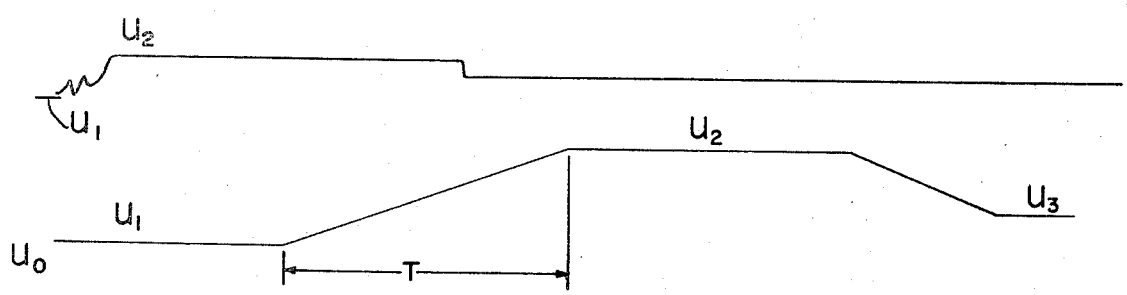

FIG. 8 comprises a series of graphs illustrating the operation of the apparatus of FIG. 7;

FIG. 9 is a schematic wiring diagram of an intensity control circuit forming a part of the apparatus of FIG. 5; and FIG. 10 is a graph of voltage versus intensity, and illustrates the operation of the apparatus of FIG. 9.

Figure 1:
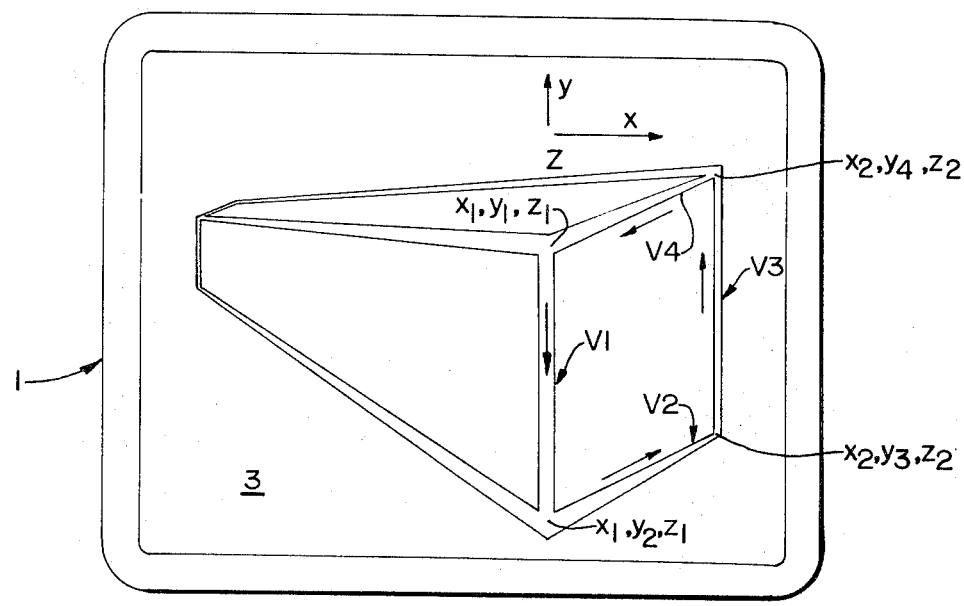
FIG. 1 is a schematic pictorial sketch illustrating a display formed on a cathode ray tube in accordance with our invention.

Referring first to FIG. 1, the display unit of our invention comprises a cathode ray tube schematically indicated at 1 and provided with a display screen 3 on which a pictorial display may be produced by appropriately controlling the intensity and position of an electron beam formed in a conventional manner in the tube.

FIG. 1 depicts on the screen a rectangular solid presented in terms of vectors such as V1, V2, V3 and V4 displayed by appropriately positioning the electron beam on the display surface 3. In FIG. 1, intensity is represented by the width of the band depicting each vector. As illustrated for the vector V1, beginning at an initial point $(x_1, y_1, z_1)$, the beam is moved to a new position $(x_1, y_2, z_1)$ at constant $z$, so that the width of the band and the corresponding intensity is constant. On the other hand, as the vector V2 is drawn from the point $(x_1, y_2, z_1)$ to a third point $(x_2, y_3, z_2)$ farther back in the $(x, z)$ plane, it is shown tapered, representing reduced intensity as $z$ is increased, to suggest the three dimensional character of the object. The manner in which this display can be effected will be described in connection with the remaining drawings, which illustrate the structure that produces it.

Figure 2:
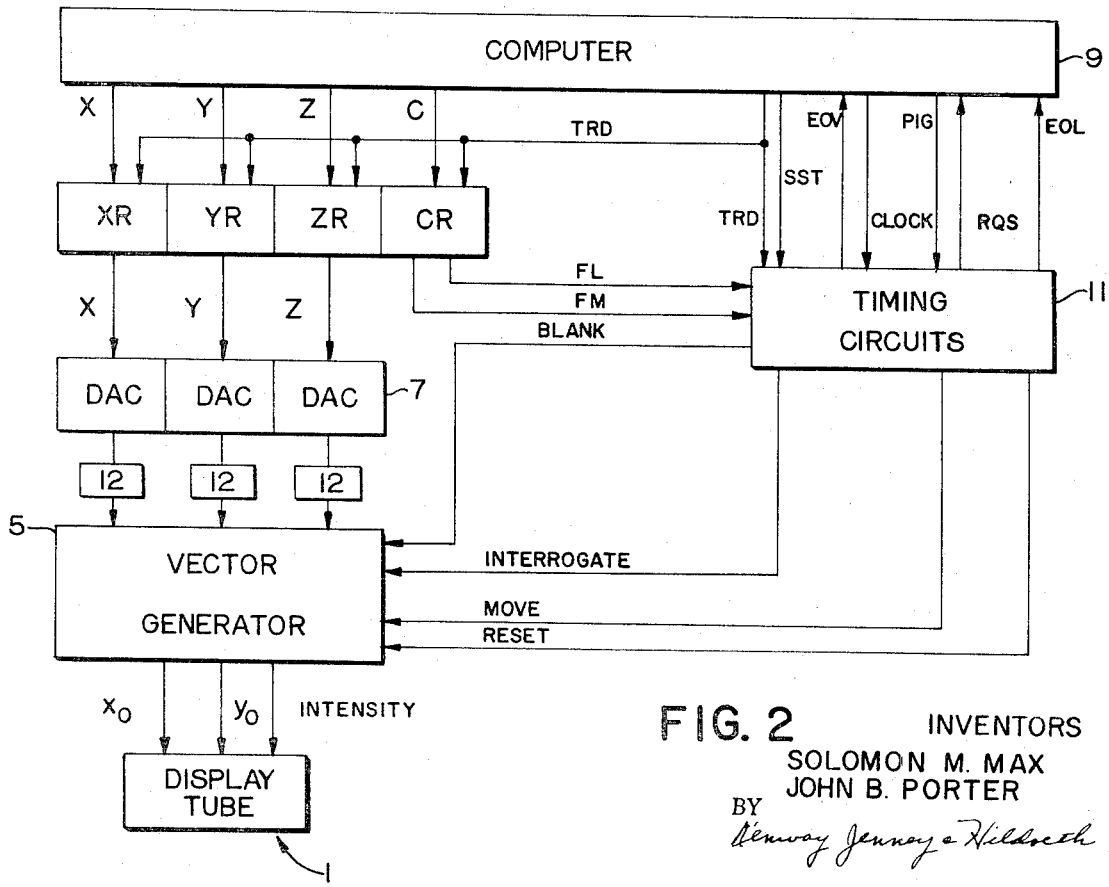
FIG. 2 is a block diagram of the apparatus of our invention shown operatively connected to a computer.

As shown in FIG. 2, the display tube 1 is shown controlled by a vector generator generally indicated at 5 by means of analog $x_0$, $y_0$ and INTENSITY signals that control the vertical, horizontal and intensity potentials of the tube. The vector generator 5 is provided with analog inputs $xi$, $yi$ and $zi$, each proportional to one of the co-ordinates of a set depicting a point in the function to be displayed, by a digital to analog converter 7. The analog signal may be transformed by an arbitrary transformation performed by the analog transformer 12. Such transformation may include scaling, rotation, translation, etc.

The converter 7 may comprise three digital to analog converters, each receiving one of a set of $m$-bit digital signals X, Y and Z from one of three digital value registers XR, YR and ZR, respectively. Each of the registers XR, YR and ZR may be a conventional digital register, for example, a 15-bit register, for storing digital values of the coordinates X, Y and Z during the preparation for display, and display, of the corresponding vector.

The analog transformer may comprise multiplying digital to analog converters which have been set to transform the digital inputs into a rotated, scaled or translated coordinate system or a combination of these.

The vector drawn on the display tube 1 by the vector generator 5 will be determined as to its end points by the previous values X1, Y1 and Z1, that define the starting point of the vector, and the new points X2, Y2 and Z2, defining the end point of the vector, for each new vector to be drawn. In this connection, it may be helpful to emphasize that the "end points" of the vectors are specified by three numbers; two spatial components and one intensity component.

A digital command register CR is associated with the value registers XR, YR and ZR. As here shown, the command register CR comprises a two-bit digital register for receiving two flag bits which, when at logic 1, are represented by the signals FL and FM. When the flag bit FL is at logic 1, it specifies that the digital values transferred to the registers XR, YR and ZR are the last on a list of vectors to be displayed. When the bit FM is logic 1, it specifies that the vector whose untransformed end point is stored in the X, Y and Z registers is to be drawn on the screen. If the bit FM is logic 0, that means that the beam is to be positioned to the end points specified by the coordinates but is to be blanked during the positioning period. The command register CR may be extended to include commands for modifying the operation of the vector generator for special purposes, as when it may be desired to display a list of vectors of constant length, to display a list of vectors which are all of a predetermined short length, or to provide a raster on the display tube 1 for the purpose of displaying television type signals or for test purposes. However a discussion of the complications introduced by such modifications would not facilitate an understanding of our invention, and hence will not be discussed.

The value registers XR, YR and ZR, and the command register CR, are arranged to be loaded at times by a computer 9 when a "transfer to destination" pulse TRD is sent by the computer. The computer 9 may comprise any conventional digital computer, but preferably comprises a hybrid computer of the source-destination type such as that shown and described in U.S. application Ser. No. 500,740, now U.S. Patent No. 3,501,624, filed on Oct. 22, 1965, by Joseph D. Grandine, 2nd, for Hybrid Computer, and assigned to the assignee of our application. As there described, the computer includes a set of transfer buses which are selectably connectable between one of a set of data sources and one of a set of destinations. Connection to the destinations is made by connecting all of the possible destination registers to the destination buses and selecting a particular destination by gating the information on the buses into the desired destination register with a TRD pulse that is unique to each destination. For simplicity, all of the coordinate and command registers are illustrated as being loaded at the same time by a single TRD pulse. In practice, it is preferred to assign a single destination to the two registers, XR and YR, and a second destination to the registers ZR and CR, whereby loading of the complete set requires two successive TRD pulses. However, that complication has no particular bearing on our invention and will not be introduced. Upon loading of a set of coordinates X, Y and Z and a command word C into the registers XR, YR, ZR and CR, subsequent operation of the vector generator 5 is determined by timing circuits 11 that synchronize its operation with the operation of the computer 9. For this purpose, the timing circuits 11 first receive the "transfer to destination" pulse TRD under the control of the computer program. That sets up an operating sequence, synchronized with a train of clock pulses supplied by the computer, to be described in more detail below, but generally, as follows:

Two cases are to be considered. First, when a drawing operation is not occurring at the time of the first TRD pulse. The timing circuits 11 produce a signal RQS that requests service from the computer 9 in a manner described in more detail in the cited application of Joseph D. Grandine, 2nd. The computer 9 will store this RQS signal until it has processed any higher priority request signals that may have been produced, and it will then produce a "priority interrupt gate" signal PIG that is applied to the timing circuits 11. When this pulse PIG is produced, if the bit FL is logic 1, and "end of list" signal EOL is gated back to the computer. At the same time, an "end of vector" pulse EOV will be gated to the computer. If EOV is sent without EOL, the computer will respond by sending the next vector on the list with a new pulse TRD. If the pulse EOL is gated to the computer, the computer will jump to a subroutine, return to its program, or carry out other instructions until an instruction is received which commences the beginning of a new vector display. When the computer has received the EOV or EOL information gated to it by the PIG signal, and has taken appropriate action, it will send a final pulse SST to reset the timing circuits 11. If another vector is to be drawn, the computer's response is to send another TRD pulse to load the next set of coordinates into XR, YR, ZR, CR. This second TRD pulse is assumed to occur after the vector generator begins the drawing of the previous vector. If the computer response can be so short that this assumption is not so, then a sufficient delay must be inserted between the TRD pulse and the signal RQS. Upon receipt of the first TRD pulse, there is produced, also, a delay during which the new digital values can settle in the digital registers XR, YR, ZR and CR and in which the digital to analog converters 7 can stabilize their outputs to the new values of $xi$, $yi$, and $zi$. After this delay period, the timing circuits 11 produce an "INTERROGATE" pulse that causes the new values of the coordinates $x_2$, $y_2$, and $z_2$ to be compared with the old values $x_1$, $y_1$ and $z_1$, selects the time during which the vector is to be drawn, and prepares the apparatus for the drawing operation.

Next, after a second delay, there is produced, within the timing circuits 11, a PRESET pulse which applies the results of the drawing time determination to a counter which is a part of the timing circuitry.

After a third delay, the signal MOVE is produced, which holds the new values of the end points $x_2$, $y_2$, and $z_2$ and applies a difference signal to integrators that have been set previously to the $x_1$, $y_1$, and $z_1$ values. At this time, the information which is loaded by TRD into register CR is used to determine whether the vector will be presented visually on the scope or whether a BLANK signal will be produced to cause the beam to be moved without display.

The second case to be considered occurs when the second TRD pulse arrives and the MOVE signal is logic 1, i.e. a vector is being drawn. In this case the RQS signal is not produced until after the present vector operation is completed, i.e. the MOVE signal is logic 0. These two cases we have considered show how the loading of registers XR, YR and ZR and CR proceeds during the drawing of vectors so that, for relatively long vectors, the rate of drawing vectors is not slowed by the computer response times. The output of the integrators is supplied to the horizontal, vertical and intensity controls of the display tube, so that the beam is moved on the screen of the display tube in accordance with the desired displacement $\Delta x$ and $\Delta y$ while its intensity is modified as determined by the value of $z$.

At the end of the spot motion time in which the vector drawing is completed, a RESET pulse is produced by the timing circuits 11, the spot motion is stopped, and the outputs of the integrators connected to the display tube are held at the new values of $x_2$, $y_2$ and $z_2$.

Figure 3:
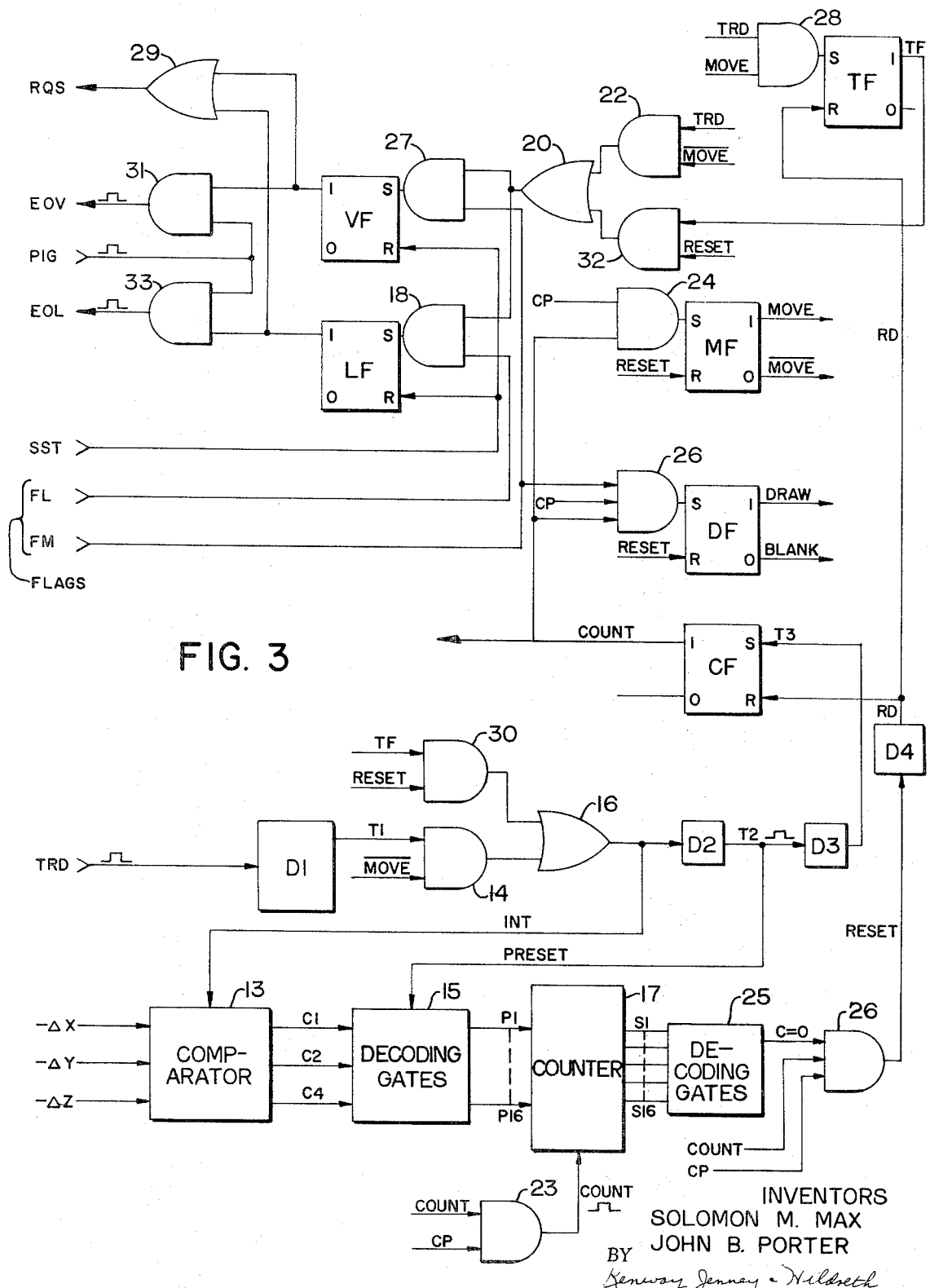
FIG. 3 is a block and line diagram of timing circuits forming a portion of the apparatus of FIG. 2.

In FIG. 3 we have shown the timing circuits in somewhat more detail. FIG. 3 should be considered in conjunction with the timing diagram of FIG. 4. As shown in FIG. 3, the timing pulse TRD is applied to a first conventional delay unit D1 that produces a first pulse T1 a delayed time after the pulse TRD that is sufficient to allow the new values to settle in the digital data registers and in the analog components of the vector generator, to be described. By the time the pulse T1 is produced, there are stable inputs $-\Delta x$, $-\Delta y$ and $-\Delta z$ applied to a comparator 13 in FIG. 3 in a manner that will be made apparent in more detail below.

The pulse T1 is supplied as one input to the AND gate 14. The other input to the gate 14 is the $\overline{\text{MOVE}}$ signal. The $\overline{\text{MOVE}}$ signal will be "true" or "logic 1" when a vector is not being drawn. This corresponds to the first case considered above. Thus if a vector is not being drawn the pulse T1 will be passed by the AND gate 14 and through OR gate 16 as an interrogate pulse "INT."

Figure 4:
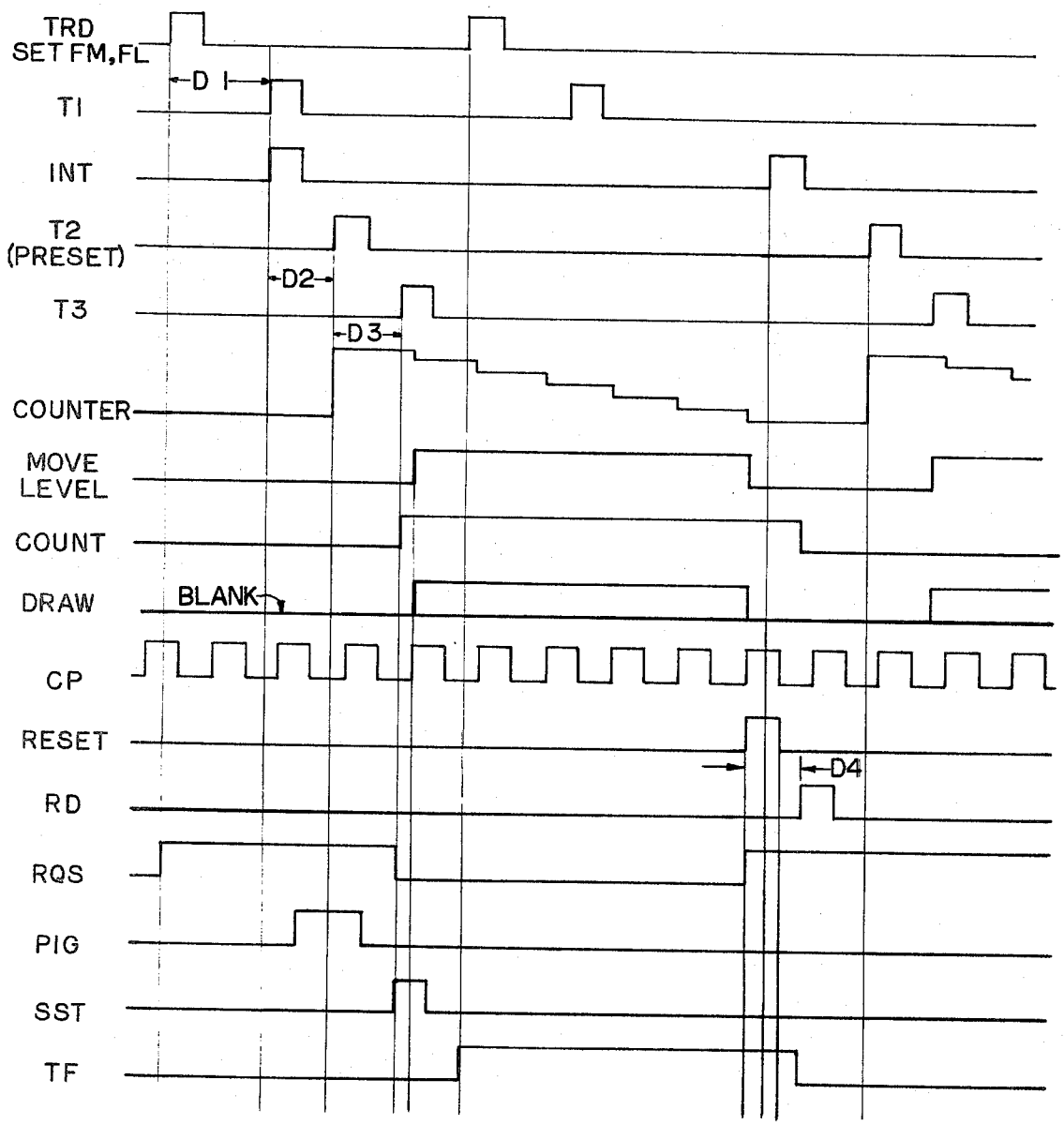
FIG. 4 is a timing diagram illustrating the operation of the apparatus of FIG. 3.

The "interrogate" pulse INT sets a digital register in the comparator 13, to be described, to produce a three-bit digital signal on leads C1, C2 and C4 whose value depends on the magnitude of the largest of the absolute values of $\Delta x$, $\Delta y$, and $\Delta z$. The INT pulse is delayed by a conventional delay unit D2 to produce pulse T2 which is identified as "PRESET." The delay of unit D2 allows the signals on leads C1, C2 and C4 to stabilize. When enabled by the pulse T2, decoding gates 15 operate in a conventional manner to convert the signals on leads C1, C2, and C4 into 5 binary signals, P1, P2, P4, P8 and P16, only the first and last of which are shown in FIG. 3. Each of the signals P1 to P16 set one stage of a five stage binary counter 17 to a count that will determine the vector drawing time in a manner to be described below. The pulse T2 will also act, through a third delay unit D3, to produce a third delayed pulse T3 after the end of the pulse T2, as shown in FIG. 4. The delayed pulse T3 sets a flip-flop CF to produce the level COUNT on the "1" output terminal of flip-flop CF. The initiating pulse TRD is synchronized with the clock pulse train of the computer and the delays D1, D2, D3 are selected to insure that the flip-flop CF is set when the clock pulse CP supplied from the computer or other souce is logic 0.

After the COUNT level is logic 1 the pulse CP goes to logic 1 to set flip-flop MF to its MOVE state, the set signal being supplied by AND gate 24. If flag bit FM is set in the control register CR indicating that a vector is to be drawn, the clock pulse CP also sets the flip-flop DF to its DRAW state providing the COUNT level is logic 1. This is accomplished by the AND gate 26. The synchronization of the MOVE and DRAW levels with the clock pulse CP train is desirable to maintain precise drawing time intervals. If the flip-flop DF is set, the vector will be presented visually, and if it is not set, the vector will be blanked during the spot motion time.

The first and succeeding clock pulses CP will be gated by the COUNT level through the AND gate 23 to produce COUNT pulses which are applied to the counter 17 to step it down from the preset count toward 0. The counter will count down one step for each such clock pulse CP while the COUNT level is present.

A set of decoding gates 25 receives the five output leads labelled S1 through S16 from the counter 17 and responds by producing a level $C=0$ when the counter has been stepped down to the count of 0. At that time, with the COUNT level present, an AND gate 26 will produce a RESET pulse to reset the comparator 13 and the flip-flops MF and DF. The RESET pulse is delayed by the delay unit D4 to produce an RD pulse which resets the flip-flops CF and TF. The function of the flip-flop TF is to store the occurrence of a TRD pulse during spot motion until the end of spot motion when the next operation can be initiated and the next request to the computer can be made. Its operation will be described in greater detail below.

Each time a TRD pulse is received from the computer a response must be made back to the computer which indicates whether further data are to be supplied (in which case a signal identified as EOV is supplied to the computer from the apparatus of FIG. 3) or that no further data are to be supplied (in which case both the EOV signal and a second signal identified as EOL are supplied to the computer). An RQS signal is also supplied to the computer when either an EOV or EOL signal is supplied. The time at which the response to the TRD pulse is generated depends on whether a vector is being drawn at the time the TRD pulse is received.

If no vector is being drawn, the response, via the RQS level, is generated immediately. If a vector is being drawn the RQS level is delayed until the drawing operation has been completed.

If the flag bit FL in the control register CR of FIG. 2 is logic 1 indicating the last vector in the list and the MOVE signal is logic 0 indicating no vector is being drawn a flip-flop LF in FIG. 3 will be set when the pulse TRD is produced. This is accomplished in the following manner. One input of OR gate 20 is supplied from the output of AND gate 22 whose two inputs are the TRD pulse and the MOVE signal. Then, when the MOVE signal is logic 0, the $\overline{\text{MOVE}}$ signal logic 1 and the TRD pulse is passed by AND gate 22, and OR gate 20 to one input of AND gate 18, the other input of which is supplied by the flag bit FL. The flip-flop LF is set when both inputs to AND gate 18 are logic 1. The set level from flip-flop LF is supplied to AND gate 33 and at an appropriate time is supplied to the computer as the EOL signal. It is also gated through OR gate 29 as an RQS signal. The production of the EOV signal is done in a similar fashion and is described below.

The flip-flop TF is set via AND gate 28 when the TRD pulse occurs and the MOVE level is logic 1 indicating a vector is being drawn. If TF is logic 1, the RESET pulse produces, via AND gate 30 and OR gate 16 an interrogate pulse INT to initiate the next vector drawing operation.

At the same time, an RQS signal is produced by setting flip-flops VF and/or LF via AND gate 32, OR gate 20 and gates 18 and 27. The "set" output levels from flip-flops VF and LF are ORed together at OR gate 29 to form the RQS signal.

When the computer is ready to respond to the RQS signal it produces a signal PIG, enabling the two AND gates 31 and 33 to produce the level EOV, with the flip-flop VF set, and the level EOL, if the flip-flop LF is set. Finally, the computer sends the ending pulse SST indicating that the EOL and/or EOV signals have been accepted to reset the flip-flops VF and LF. If the level EOL has not been produced, the computer response will be a TRD with a new set of values for the next vector drawing operation.

Referring to FIG. 4, the time interval beginning with T3 during which the flip-flop MF is set and the counter 17 is stepped down, constitutes the vector drawing interval that is related to other time intervals in a manner that will be discussed below.

Referring next to FIG. 5, we have shown the elements of the vector generator in their relationship to the display tube 1. As shown, the tube 1 has an anode connected to a high voltage terminal HV in a conventional manner, and a cathode 34, to which an intensity control voltage produced in a manner to be described is applied through an amplifier 35. The tube is provided with at least one control grid 37 connected in a conventional manner to a conventional brightness control for timing the base level about which the intensity is modulated. A horizontal control unit, schematically indicated at 39, produces a horizontal output control voltage $-x_0$ that is applied through an amplifier 41 to the horizontal deflection coil 43 of the tube 1. A vertical control unit 45 produces a vertical control voltage $-y_0$ that is applied through an amplifier 47 to the vertical deflection yoke 49.

A depth cueing control 51 is provided that may be of the same construction as the vertical control 45 and horizontal control 39, except that because it is used for a different purpose, its gain may be somewhat different, as will appear. It produces an output voltage $-z_0$ which is used to control an intensity control unit 53, to be described below. The intensity control unit also receives a signal $|\dot{x}|$ from the horizontal control 39, and a signal $|\dot{y}|$ from the vertical control 45, for purposes to appear.

A gain control unit 55 is provided which receives signal voltages $-\Delta x$, $-\Delta y$ and $-\Delta z$ from the horizontal control unit 39, the vertical control unit 45 and the depth cueing control unit 51, respectively. In response to these inputs, the gain control unit 55 produces five output signals G1, G2, G3, G4 and G5, only the first and last of which are illustrated in FIG. 5, in the form of a five bit digital control signal for selecting the gains of the units 39, 45 and 51 in a manner to appear below.

The control units 39, 45 and 51 each receive the timing signal labelled MOVE. This signal is produced as described above in connection with the timing circuits of FIG. 3, and its function will be more apparent when the details of the controls 39, 45 and 51 are described below in connection with FIG. 7.

Figure 6:
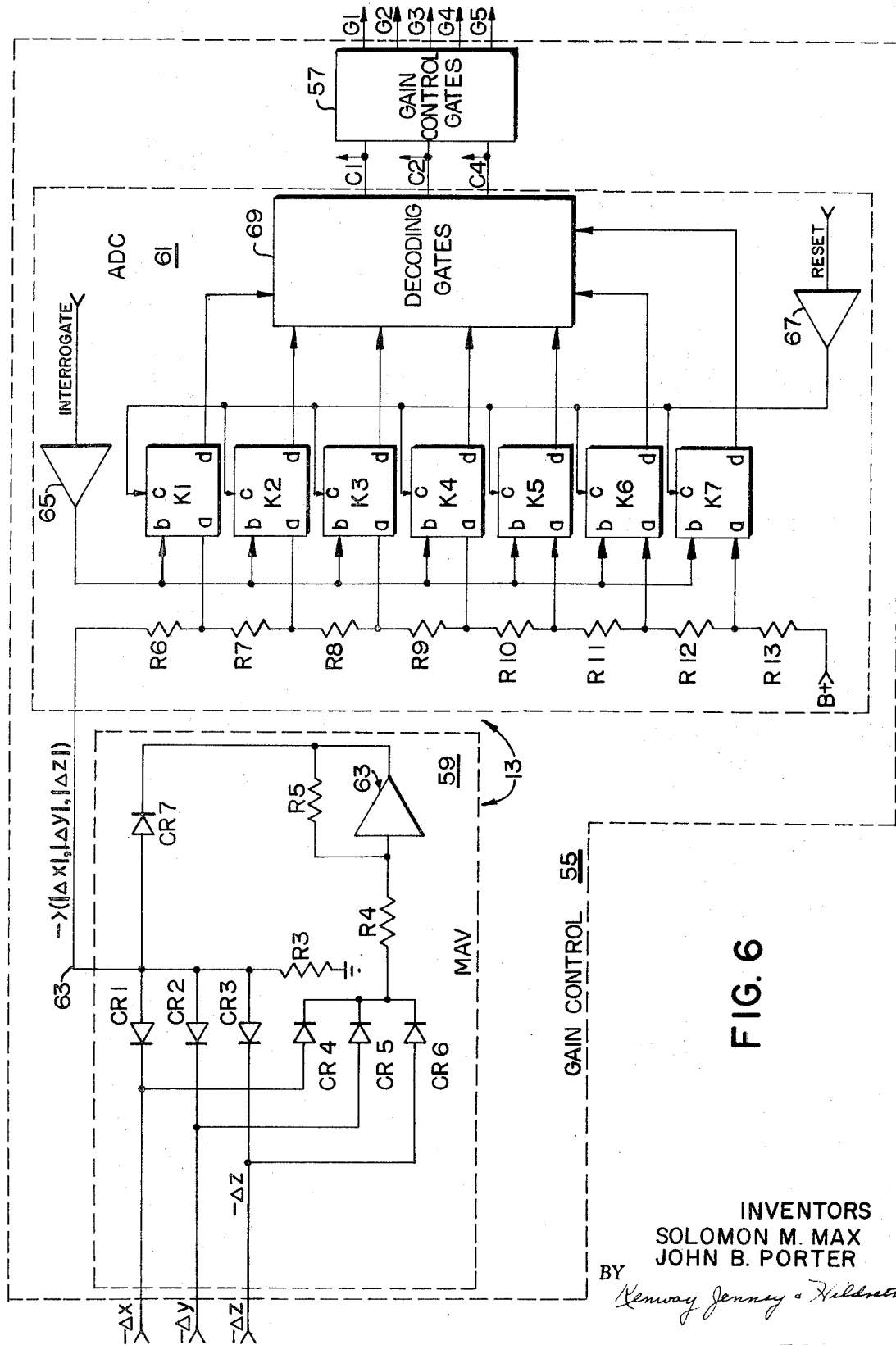
FIG. 6 is a diagram partially in block and partially in schematic form of gain control and comparator apparatus forming a portion of the apparatus of FIGS. 3 and 5.

As shown in FIG. 6, the gain control unit 55 includes the comparator 13 of FIG. 3 and a set of gain control gates 57. The comparator in turn comprises a maximum absolute value network 59 and an analog to digital converter 61.

The maximum absolute value network 59 selects the maximum of the absolute values of the input signals $-\Delta x$, $-\Delta y$ and $-\Delta z$, any of which may be either positive or negative. Negative voltages are compared by a set of three diodes CR1, CR2 and CR3. The diode CR1 has its cathode connected to the terminal on which the signal $-\Delta x$ appears, and its anode returned to ground through a resistor R3. The diode CR2 has its cathode connected to the terminal on which the signal $-\Delta y$ appears, and its anode returned to ground through the same resistor R3. The diode CR3 has its cathode connected to the terminal on which the signal $-\Delta z$ appears. The diode CR3 is returned to ground through the same resistor R3, so that the cathode of the diode CR3 is at a potential equal to $-\Delta z$. The anode of the diode CR3 is connected to the anodes of the diodes CR1 and CR2.

The cathodes of the diodes CR1, CR2 and CR3, respectively, are each connected to the anode of a different one of the set of three diodes CR4, CR5 and CR6. The cathodes of the diodes CR4, CR5 and CR6 are connected together and to one terminal of a resistor R4 having its other terminal connected to the input terminal of a conventional amplifier 63. A feedback resistor R5 is connected between the output terminal of the amplifier 63 and its input terminal. The output terminal of the amplifier 63 is connected to the cathode of a diode CR7 that has its anode connected to the junctions of the anodes of the diodes CR1, CR2 and CR3.

The diodes CR1, CR2 and CR3, together with the resistor R3, serve as a selector of the maximum negative value of $-\Delta x$, $-\Delta y$ or $-\Delta z$. For example, if $-\Delta x = -11$ volts, $-\Delta y = -6$ volts and $-\Delta z = -5$ volts, the potential across the resistor R3 will be $-11$ volts, ignoring forward diode drops, and both the diodes CR2 and CR3 will be biased against conduction. In that case, all of the diodes CR4, CR5 and CR6 will be blocked.

The diodes CR4, CR5 and CR6, together with the amplifier 63, its input and feedback resistors R4 and R5, and the diode CR7, serve to convert any positive input voltage to a negative input voltage that can be compared with other negative input voltages applied to the other terminals. For this purpose, the resistors R4 and R5 are selected so that a voltage of, for example, $+5$ volts applied to the $-\Delta x$ terminal will appear as $-5$ volts applied between the cathode of the diode CR7 and ground.

The output potential appearing on the lead 63 of the circuit 59 will be the greatest of the absolute values of $\Delta x$, $\Delta y$ and $\Delta z$. That value is an approximation to the length of the vector to be drawn that is best when one of the components $x$ or $y$ is considerably larger than the other and $z$ is small. The value of $z$ is preferably scaled down so as to insure its being small. There is no requirement for constant velocity for $z$. The amount of error is not serious for the purpose intended, which is to make the vector drawing rate approximately constant for vectors of different lengths. The purpose of the approximately constant writing rate is to preserve an apparently constant intensity for different vectors which differ only in length. Since the apparent intensity is affected both by the cathode-to-screen voltage of the cathode ray tube, and by the beam trace rate, a further improvement can be obtained, in a manner to be described, by modulation of the intensity voltage. However, that ramification will be discussed in its proper place below.

The output voltage appearing on the lead 63 of the maximum absolute value network 59 is compared with a standard reference voltage B+ by means of an analog-to-digital convertor 61, next to be described.

The analog to digital converter 61 comprises a set of comparators K1, K2, K3, K4, K5, K6 and K7, each having an input terminal $a$ connected to a different point on a resistance network extending from the lead 63 through a set of resistors R6, R7, R8, R9, R10, R11, R12 and R13 in series to a source of reference potential B+.

Each of the comparators K1 through K7 is preferably of the type shown and described in detail in U.S. Pat. No. 3,406,297, granted on Oct. 15, 1968 to Paul G. Lucas for Polarity Responsive Comparator Circuit For Simultaneous Analog-Digital Convertors Using A Tunnel Diode. However, it will be apparent to those skilled in the art that other comparators could be employed if so desired. Each of the comparators such as K1 has an input terminal $a$, an "interrogate" terminal $b$, a reset terminal $c$, and an output terminal $d$. When an "interrogate" pulse is applied to the input terminal $b$, the output at terminal $d$ will assume a logic 1 potential if the potential at the input terminal *a* is negative, or a logic 0 potential if the input terminal *a* is then positive, and the output terminal will remain in that state until a reset pulse is applied to the input terminal *c* of the comparator, whereupon the output terminal *d* will resume the logic 0 condition.

For ground potential on the lead 63, none of the input terminals *a* of the comparators K1 through K7 will be negative, and an interrogate pulse applied to the comparators will result in an output 0 signal at each of their output terminals *d*. As the potential on the lead 63 becomes more and more negative, first the junction of the resistors R6 and R7, and finally the potential at the junctions of the resistors R12 and R13, will become negative, so that for a sufficiently large value of the signal on the lead 63 all the comparators will produce logic 1 output signals.

It will be apparent that, including the states intermediate those just mentioned, there are eight states of the seven output leads *d*. These output leads are connected to a set of conventional decoding gates 69 to produce three binary output signals C1, C2 and C4 on three output leads, in ascending binary order with the increasing number of comparators that produce logic 1 output signals. Specifically, if none of the comparators K1 through K7 produces a logic 1 output signal, the bits C1, C2 and C4 are 0-0-0, respectively. If all of the comparators K1 through K7 produce logic 1 output signals, the code combination on the leads C1 through C4 is 1-1-1.

The RESET signal, produced as described in connection with FIG. 3 above, is applied through an amplifier 67 to all of the input terminals *c* of the comparators K1 through K7. When present, that signal resets the comparator to an initial 0 state at the end of each vector drawing operation.

The output leads of the gates 69 on which the signals C1, C2 and C4 appear are connected to the input terminals of the decoding gates 15 in FIG. 3, and they are also connected to a second set of control gates 57, of any conventional construction, which in response to the binary code on the leads C1, C2 and C4 produces a set of digital signals on five output leads G1, G2, G3, G4 and G5, in accordance with an encoding to be described in detail below.

FIG. 7 shows the details of a control circuit that may be used as any of the controls 39, 45 and 51 in FIG. 5. Identical values may be used for the components of the horizontal and vertical controls, and somewhat different values for the depth cueing control, as will appear. In general, the apparatus may be considered as a sample-and-hold circuit connected in an integrate-and-hold circuit, as will appear.

FIG. 7 has been labelled in terms of a general variable *u*, which may represent either *x*, *y* or *z*. As shown, the apparatus is provided with an input terminal *a*, to which the input signal $u_1$ is applied with respect to ground. This signal $u_1$ is applied through a first summing resistor R14 to the input terminal of an amplifier 71. A second input is supplied through a resistor R15 from an output terminal *b* of the network; as indicated, the latter will assume a pro tential $-u_0$. The amplifier 71 is provided with a feedback resistor R16. The values of the resistors R14, R15 and R16 are chosen so that the potential of the output terminal *c* of the amplifier 71 is equal to $-\Delta u$, where $\Delta u$ equals $u_1-u_0$. This voltage is applied to the gain control 55 in FIG. 5, and is also applied to a variable gain sample-and-hold network, shown in FIG. 7 and next to be described.

The sample and hold network comprises an amplifier 73 having an input terminal connected to the output terminal *c* of the amplifier 71 through an input resistance network including a resistor R17. In parallel with the resistor R17 is the series combination of a resistor R18 and a conventional electronic switch S1 that is arranged to be closed when the signal G1 is present at logic 1.

The output of the amplifier 73 is connected through a resistor R24 in series with an electronic switch S7 to the input terminal of an integrating operational amplifier 75. The switch S7 is arranged to be closed by an amplifier 77 when the level MOVE, produced by the flip-flop MF in FIG. 3, is not present. The circle at the output terminal of amplifier 77 indicates a logical inversion. The amplifier 75 is provided with a feedback capacitor C1 to form a conventional hold circuit that will maintain the potential at the output of the amplifier 75 constant when the switch S7 is opened.

A feedback resistance network is connected between the input terminal of the operational amplifier 73 and the output terminal of the amplifier 75. This network includes four resistors R19, R20, R21 and R22, each connected in series with a different one of a set of electronic switches S2, S3, S4 and S5. Each of the switches S2 through S5 is arranged to be closed when the corresponding signal applied to it, G2 through G5, is at logic 1 potential.

The output terminal of the amplifier 75 is connected to the input terminal of an absolute value amplifier 79 to produce a signal $|\dot{u}|$, or the absolute value of the signal $\dot{u}$ at the output of the amplifier 75, where $\dot{u}$ equals $K\Delta u$, and K is the gain of the sample and hold network. Specifically, if the selected combination of resistors R17 and R18 is taken as R1, and the selected combination of resistors R19 through R22 is termed R2, K equals $R2/R1$. The value of K is selected in dependence on the gain control signals G1-G5 in a manner that will be described below.

The signal $\dot{u}$ appearing at the output of the amplifier 75 is supplied through a resistor R23 in series with an electronic switch S6 to the input terminal of an integrating operational amplifier 81. The amplifier 81 is provided with a feedback capacitor C2, and its output terminal is connected to the output terminal *b* described above on which the signal $-u_0$ appears.

The switch S6 is arranged to be closed by an amplifier 83 when the signal MOVE is present. As noted above, that will occur when the flip-flop MF in FIG. 3 is set.

The value of the resistor R23 is selected in combination with the value of the capacitor C2 so that the time constant R23×C2 equals a predetermined value, which in one practical embodiment of our invention was 16 microseconds for the horizontal, vertical and depth cueing. The absolute values of the resistors R14 through R22 will depend on the detailed design of the amplifiers 71, 73, 77 and 75, but if the value of the resistance R19 is taken as R, then the other values are as follows: R14, R15, R17 and R20 equal 2R; R16 and R21 equal 4R; R18 equals ⅔R, and R22 equals 8R.

Comparing FIGS. 4 and 7, operation of the control circuit of FIG. 7 will next be described, starting with the first pulse TRD in FIG. 4. At this time, let the values of X, Y and Z in the registers XR, YR and ZR (FIG. 2) be changed from $X_1$, $Y_1$ and $Z_1$, to $X_2$, $Y_2$, and $Z_2$; or in the general terms of FIG. 7, from U1 to U2 as indicated in the second line of FIG. 8. Referring again to FIG. 7, at this time the signal MOVE is absent, so that the switch S6 is open and the switch S7 is closed.

After a time sufficient to permit the registers to settle, the pulse T1 in FIG. 4 is produced to cause the interrogate pulse to be produced and actuate the gain control unit 55 in FIG. 6. At this time, the values $-\Delta u$ at terminal *c* in FIG. 7 will have settled for each of the controls 39, 45 and 51 in FIG. 5, so that the inputs $-\Delta x$, $-\Delta y$, and $-\Delta z$ in FIG. 6 will be present at stable values and the output of the comparator 61 in FIG. 6 will assume the proper digital value in accordance with the absolute magnitude of the largest of the signals $-\Delta x$, $-\Delta y$ and $-\Delta z$. An appropriate sequence of gain signals G1 through G5 will be produced, causing the switches S1 through S5 in FIG. 7 to be set in a pattern determining the gain of the sample and hold network including the amplifiers 73 and 75. The output of the amplifier 75 will now assume the potential $u$, where $u$ equals $K\Delta u$ and K is selected in a manner to appear.

When the pulse T3 is produced as described in connection with FIG. 3 causing the level MOVE to be produced, as represented in the first line of FIG. 8, the switch S7 will be opened to put the amplifier 75 into its hold state and the switch S6 will be closed to allow the amplifier 81 to begin to integrate, with a time constant dependent on the resistors R23 ad C2 as described above. The signal MOVE will be present for a time T selected in dependence on the outputs C1, C2 and C4 of the comparator 13 in FIG. 3, which determine the preset state of the counter 17. The integration will thus proceed for the time T as shown in FIG. 8. That time T is selected, as described above, in dependence on the approximate length of the vector to be drawn to secure approximately equal writing rates for vetcors of different lengths. The values of K, the gain of the sample and hold network including the amplifiers 73 and 75, T, the integrating time for the integrator 81, and $\tau$, the time constant of the integrating amplifier 81 determined by the resistor R23 and the capacitor C2, are related by the equation $$\frac{KT}{\tau} = 1$$

Assuming that the output voltage $-u_0$ of the amplifier 81 is initially at the value $-u_1$, where $u_1$ is the coordinate of the end point of the preceding vector drawn, the result of the integrating the voltage $u$ over the time T will be a new voltage $-u_0$ equal to $$-u_1 - \frac{uT}{\tau}$$

Since $u = K\Delta u = K(u_2 - u_1)$, the new output voltage $u_0$ is given by (1) $$u_0 = -u_1 - \frac{KT(u_2 - u_1)}{\tau} = -u_2$$

Thus, while the writing speed of the vector is only approximately proportional to its length, the selection of the constants in the manner just described makes the end point of the vector exactly coincide with the input value $ui$, within the precision of the equipment. Practical values of the time constants, the integrating time and gain settings for a particular embodiment of the apparatus are set forth in the following Table I.

TABLE I

| Counter preset | C1 | C2 | C4 | G1 | G2 | G3 | G4 | G5 | T | K | LOV |
|---|---|---|---|---|---|---|---|---|---|---|---|
| 1 | 0 | 0 | 0 | 1 | 0 | 1 | 0 | 0 | 2 | 8 | 0–½" |
| 2 | 0 | 0 | 1 | 1 | 0 | 0 | 1 | 0 | 4 | 4 | ½–1 |
| 4 | 0 | 1 | 0 | 1 | 0 | 0 | 0 | 1 | 8 | 2 | 1–2 |
| 6 | 0 | 1 | 1 | 1 | 0 | 0 | 1 | 1 | 12 | 4/3 | 2–3 |
| 8 | 1 | 0 | 0 | 0 | 0 | 0 | 1 | 0 | 16 | 1 | 3–4 |
| 10 | 1 | 0 | 1 | 0 | 1 | 0 | 1 | 0 | 20 | 4/5 | 4–5 |
| 14 | 1 | 1 | 0 | 0 | 1 | 1 | 1 | 0 | 28 | 4/7 | 5–7 |
| 18 | 1 | 1 | 1 | 0 | 1 | 0 | 0 | 1 | 36 | 4/9 | 7–10 |

In Table I, the "counter preset" represents the preset state of the counter 17 in FIG. 3, and indicates the number of pulses required to restore the counter to 0. The values of C1, C2, C4, G1, G2, G3, G4 and G5 are given in binary code. T is in microseconds, K is the gain of the sample and hold network, and LOV is the length of the vector to be drawn, in inches. The values are given for the horizontal and vertical controls, and are the same for the depth cueing control. It should be noted that normally Z is attenuated so that the Z output is only proportional to Z. This insures that the $-\Delta Z$ input to the operational amplifier 59 will normally be small.

As an example of the manner in which the gain of the sample and hold network is computed, assume that C1, C2 and C4 are 0, 1 and 1, respectively, so that the gain switch S1 is closed and the gain switches S4 and S5 are closed with the other switches open. The values of the resistors R17 and R18 are given above as 2R and ⅔R, respectively. It will be apparent that the input resistance to the sample and hold network is their parallel combination, or R/2. The feedback impedance will be the resistance of resistors R19 and R20 in parallel, or R and 2R in parallel; that is, ⅔R. The gain K will then be $$\frac{2R}{3} \div \frac{R}{2}$$

or 4/3, as given in the table. Other values may similarly be computed.

It will be apparent that since each of the integrators operates for the samelength of time in moving from the beginning point of the vector to its end point, the resultant vector will be accurate throughout its length although each component may be traced at a different rate.

Having described the manner in which the vector component voltages are generated, and thereby completed the description of the horizontal and vertical controls of the cathode ray tube 1 in FIG. 5, the intensity control 53 will next be considered. FIG. 9 shows a circuit for producing an intensity control voltage $e_0$ which performs the dual functions of improving the approximation to constant apparent intensity of the trace on the scope with constant Z, and linearizing the apparent change in intensity with changing values of Z.

The first function is performed by making the output intensity voltage $e_0$ closely proportional to the actual writing speed of the vector. Recalling from Table I above that vectors of, for example, from ½ inch to 1 inch in length are all drawn in 4 microseconds, it will be apparent that the actual writing speed of any particular vector in this range will be determined by its length. In particular, the speed $ds/dt$ at which the beam actually moves, at any constant value of Z, will be equal to $$\sqrt{\left(\frac{dx}{dt}\right)^2 + \left(\frac{dy}{dt}\right)^2}$$

The depth cueing response is somewhat subjective, in that it relates not only to the response of the human eye but to psychological impression made by that response. We have found that variations in Z are best suggested by modifying the intensity voltage in accordance with an exponential function of Z. The resultant voltage $e_0$, with which both the speed linearizing and depth cueing functions are performed, is preferably produced by the circuit of FIG. 9, in a manner next to be described.

The apparatus of FIG. 9 comprises a differential amplifier 85 having its positive input terminal connected to a summing terminal on which there appears a potential $e_1$. A conductive feedback path 87 is provided between the output terminal of the amplifier and its negative input terminal, so that its output voltage will also be essentially $e_1$. The output terminal of the amplifier 85 is returned to ground through a pair of resistors R28 and R29 in series.

The input voltage $e_1$ is equal to the sum of a reference potential $e_4$, established by a suitable source 88 of constant negative voltage approximately equal to a silicon diode drop, and the forward drop through a silicon diode CR10. The current $i_1$ through the silicon diode CR10 is determined by currents through three summing resistors R25, R26 and R27, each having one terminal connected to the anode of the diode CR10. The other terminal of the resistor R25 is connected to the input terminal on which the voltage $|\dot{x}|$ appears. The resistor R27 has its other terminal connected to the input terminal in which the potential $|\dot{y}|$ appears. The signals $|\dot{y}|$ and $|\dot{x}|$ are applied in parallel to the other terminal of the resistor R26 through two diodes CR8 and CR9.

A reference signal current $i_3$ is supplied by an adjustable current source here shown as a potentiometer P1 excited by a suitable source of negative voltage with respect to ground.

The potential $e_2$ at the junction of the resistors R28, R29 and the wiper of the potentiometer P1 is connected to the positive input terminal of a second differential amplifier 89. The negative input terminal of the amplifier 89 is connected to the terminal on which the signal $-z_0$ appears through a resistor R30. A resistor R31 is connected in a feedback path between the negative input terminal of the amplifier 89 and its output terminal. The output terminal of the amplifier 89 is connected through a second silicon diode CR11 to the negative terminal of a third differential amplifier 91.

The diodes CR10 and CR11 should be selected to be closely matched in current and voltage relationships. The particular relationship between current and forward voltage that is desired will be described below.

The positive input terminal of the amplifier 91 is connected to the terminal at which the reference potential $e_4$ appears. The amplifier 91 produces an output voltage $e_5$ at an output terminal that is returned to the negative input terminal through a feedback resistor R32.

The output terminal of the amplifier 91, at the potential $e_5$, is connected to the negative input terminal of a fourth differential amplifier 93 through a variable resistor R33. A resistor R34 is connected between the negative input terminal of the amplifier 93 and the wiper of a potentiometer P2. The latter produces an offsetting voltage, in a manner and for purposes to be described.

The output terminal of the amplifier 93 is at the desired intensity potential $e_0$, and is returned to the negative input terminal through a feedback resistor R35. The positive input terminal of the amplifier 93 is connected to the reference potential $e_4$.

A blanking network, functioning in a manner to be described, is connected between the input terminal at which the signal $-z_0$ appears and the negative input terminal of the amplifier 93 through an inverting amplifier 95, a diode CR12 and a resistor R36. A second blanking function is produced by the signal BLANK (FIG. 3), supplied through a diode CR13 and the resistor R36 to the negative input terminal of the amplifier 93.

Having described the general structure of the intensity control apparatus of FIG. 9, its mode of operation, and further details of its construction, will next be considered in terms of the theory of operation of the apparatus.

From elementary considerations, the current $i_1$ through the silicon diode CR10 is approximately given by $$(2) \quad i_1 \cong \frac{|\dot{x}|}{R25} + \frac{|\dot{y}|}{R27} + > \frac{(|\dot{x}|, |\dot{y}|)}{R26}$$

where $>|\dot{x}|, |\dot{y}|)$ means "the greater of $|\dot{x}|$ and $|\dot{y}|$."

If $R_0 = .555 R25$, $R26 = .707 R25$, and $R25 = R27$, it can be shown that, to an approximation of $\pm 7$ percent, Equation 2 can be written as $$(3) \quad i_1 \cong \sqrt{\frac{|\dot{x}|^2 + |\dot{y}|^2}{R_0}}$$

Equation 2 is exactly true if the forward drops of CR8 and CR9 are neglected and the voltage $e_1$ is assumed to be much less than $|\dot{x}|$ or $|\dot{y}|$. Since each vector is drawn at some constant writing rate $ds/dt$, that rate will evidently be proportional to $\sqrt{|\dot{x}|^2 + |\dot{y}|^2}$. Thus the current $i_1$ will approximately be proportional to $ds/dt$.

The matched characteristics of the diodes CR10 and CR11 should be selected so that the forward drop of each diode equals $$V_0 + V_1 \ln \frac{i}{i_0}$$

where $V_0$ and $V_1$ are constants and $i$ is the current through the diode; typically $V_0 = 0.5$ volt, $V_1 = 0.035$ volt, and $i_0 = 10$ microamperes. A convenient source of such diodes is a monolithic integrated circuit. Thus, $$(4) \quad e_1 = V_0 + V_1 \ln \frac{i_1}{i_0} + e_4$$

The voltage $e_2$ is given by $$(5) \quad e_2 = \left(\frac{R29}{R28+R29}\right) e_1 + \left(\frac{R28 R29}{R28+R29}\right) i_3$$

if the impedance looking into the source $i_3$ is considered to be very high.

The amplifier 89 preferably has a sufficiently high gain that the voltage at the positive input terminal is equal to the voltage at the negative input terminal. Thus, if $R31 = R28$ and $R30 = R29$, $$(6) \quad e_2 = \left(\frac{R29}{R28+R29}\right) e_3 - \left(\frac{R28}{R28+R29}\right) z_0$$

But $$(7) \quad e_3 = e_4 + V_0 + V_1 \ln \frac{i_2}{i_0}$$

If $$\beta \overset{\Delta}{=} \frac{R29}{R28+R29}$$

then, from Equations 4, 5, 6 and 7, $$(8) \quad \left[e_4 + V_0 + V_1 \ln \frac{i_1}{i_0}\right]\beta + i_3 R28 \beta$$
$$= \beta \left[e_4 + V_0 + V_1 \ln \frac{i_2}{i_0}\right] - z_0 \frac{R28}{R29}$$

Solving for $i_2$, $$(9) \quad i_2 = i_1 \exp \frac{R28}{V_1}\left(\frac{z_0}{R29} + i_3\right)$$

From Equations 2 and 9, $$(10) \quad i_2 = \sqrt{\frac{|\dot{x}|^2 + |\dot{y}|^2}{R_0}} \exp \left[\frac{R28}{V_1} \frac{z_0}{R29} + i_3\right]$$

The voltage $e_5$ is given by $$(11) \quad e_5 = -R32 i_2 + e_4$$

Assuming for the moment that the potentiometer P2 is adjusted so that there is no current through R34, and that the anodes of the diodes CR12 and CR13 are both below ground, $$e_0 = -\frac{R35}{R33} e_5 + e_4 =$$
$$(12) \quad e_0 = \left(\frac{R32 \times R35}{R33}\right) i_2 - \frac{R35 \times e_4}{R33} + e_4$$

If the potentiometer P2 is then adjusted to introduce the proper constant offset, then $$(13) \quad e_0 = \frac{R32 \times R35}{R35} i_2$$

$$(14) \quad e_0 = \frac{R32 \times R35}{R33 \times R0} \sqrt{|\dot{x}|^2 + |\dot{y}|^2} \exp \frac{R28}{V_1}\left(\frac{z_0}{R29} + i_3\right)$$

The gain of the transfer function defined by Equation 14 can be adjusted by adjusting the reference current $i_3$. When either the BLANK signal is produced at a logic 1 (positive) level, or when $-z_0$ is greater than 0, the voltage $e_0$ will be driven down to produce a blank intensity level. The resultant scope intensity I is plotted as a function of $z_0$ in FIG. 10, illustrating the preferred adjustment in which the intensity rises exponentially as $z$ increases from a negative value to maximum intensity at $z=0$ whereafter the beam is blanked.

It will be apparent from the above description that the apparatus of our invention provides a rapid and effective means for displaying sequences of vectors to produce a simulated three dimensional display. To summarize the operation of the system briefly, each new set of vector end point coordinates is first registered. Next, the approximate length of the vector to be drawn is detected, as the longest of the components of the vector. That approximate length is used to fix the time T over which the vector is to be drawn, and to fix the gain K of each of a set of sample and hold circuits, one associated with coordinate x, y and z. The sample and hold circuits, in their "sample" states, settle to the values $K\Delta u$ determined by the input values $\Delta u$ of the components of the new vector. The sample and hold circuits are then set to "hold," and the vector drawing operation is begun. The horizontal and vertical controls of the display tube are each connected to the output of an integrate and hold circuit, each initially in its "hold" state to fix the beam at the end point of the vector last drawn. The intensity control of the display tube is also connected to the output of an integrate and hold circuit, but through an intensity control circuit. The integrators are now set to their "integrate" states, in which they are connected to the sample and hold circuits. The vector is traced by operation of the integrators, each in response to its input $K\Delta u$, for the time T. The values K and T are so determined relative to the time constant for each integrator that $$\frac{KT}{\tau} = 1$$

whereby the output voltage from each integrator goes linearly from the initial value $u_1$ to the new value $u_2$ in the time T. During the drawing of each vector, the intensity control circuit modulates the z component to make it proportional to $ds/dt$ at constant z, and to make it exponential in z for effective depth cueing.

While we have described the apparatus of our invention with respect to the details of a preferred embodiment of our invention, many changes and variations will be apparent to those skilled in the art upon reading our description.

Having thus described our invention, what we claim is:

1. A vector generator for producing horizontal, vertical and intensity control signals suitable for producing a vector display, comprising horizontal control means for producing a horizontal output signal, vertical control means for producing a vertical output signal, and intensity control means for producing an intensity output signal, said horizontal and vertical control means each comprising an integrator having an output terminal on which said output signal appears and an input terminal, storage means connected to said output terminal and responsive to an applied input signal for storing a signal in accordance with the difference between the applied signal and the signal on said output terminal, and switching means operable to connect said storage means to said input terminal to cause said integrator to change the signal on said output terminal to agree with said applied signal, means controlled by the storage means in said horizontal and vertical control means for supplying difference signals corresponding to the stored signals to said intensity control means, and said intensity control means comprising computing means responsive to said difference signals for producing an intensity output signal approximating the square root of the sum of the squares of said difference signals.

2. A deflection signal generator, comprising a variable gain sample and hold circuit having an input terminal and an output terminal and being operative to provide at its output terminal a continuing voltage which is related to a voltage applied to its input terminal, during sampling, by a factor determined by the preselected gain of said sample and hold circuit an integrator having a time constant $\tau$, means for applying the output voltage from said integrator and an applied input signal to respective input terminals of a summing network thereby to provide a net output signal which is a function of the difference between said applied signal and said integrator output voltage, means responsive to the net output signal from said summing network for adjusting the gain of said sample and hold circuit to a value K, means for applying said net output signal to the input terminal of said sample and hold circuit during sampling thereby to generate a continuing voltage which is a function of K and of the difference between said applied signal and said integrator output voltage at the time of sampling, and means operative after sampling for applying said continuing voltage from the sample and hold circuit to said integrator for a time T, where $$\frac{KT}{\tau} = 1$$

3. A vector generator for displaying vectors in the form of a light trace on the screen of a cathode ray tube, comprising a first integrator having a time constant $\tau_1$ connected to said tube to provide a first deflection signal, a second integrator having a time constant $\tau_2$ connected to said tube to provide a second deflection signal, first storage means for storing a signal in accordance with a first deflection signal value, second storage means for storing a second signal in accordance with a second deflection signal value, means controlled by said first integrator and said first storage means for producing a first difference signal in accordance with the difference between their deflection signals, means controlled by said second integrator and said second storage means for producing a second difference signal in accordance with the difference between their deflection signals, means responsive to said difference signals for producing a measuring signal approximating the length of the vector represented by the difference signals, first multiplying means responsive to said first difference signal and said measuring signal for producing a first product signal equal to $K_1$ times the first difference signal, second multiplying means responsive to said second difference signal and said measuring signal for producing a second product signal equal to $K_2$ times the second difference signal, first switching means closable to connect said first multiplying means to said first integrator, second switching means closable to connect said second multiplying means to said second integrator, and timing means responsive to said measuring signal for closing said switching means for a time T, where $$\frac{K_1 T}{\tau_1} = \frac{K_2 T}{\tau_2} = 1$$

4. The apparatus of claim 3, in which said timing means comprises a counter, a source of pulses selectively operable to step said counter, means for opening said switching means when said counter reaches a predetermined state, means controlled by said measuring signal for presetting said counter to a state which differs from said predetermined state by a number which is a function of the amplitude of said measuring signal, and means for initiating a timing interval by connecting said pulse source to said counter to step said counter toward said predetermined state and for simultaneously closing said switching means whereby said switching means are opened after a time interval which is determined by the amplitude of said measuring signal.

5. The apparatus of claim 3, in which said means for producing a measuring signal comprises comparator means responsive to said difference signals for producing a measuring signal in accordance with the difference signal having the largest absolute value.

6. The apparatus of claim 3, in which said means for producing a measuring signal comprises function generating means responsive to said difference signals for producing a measuring signal proportional to the square root of the sum of their square.

7. The apparatus of claim 3, in which each of said multiplying means comprises a variable gain sample and hold network, and means responsive to said measuring signal for adjusting the gain of said sample and hold network to the value $K_i$, where $i=1,2$.

8. The apparatus of claim 7, in which said variable gain sample and hold network comprises an integrating amplifier having a degenerative feedback network comprising a set of resistors each connected in series with a different electronic switch, each such switch and resistor being connected in parallel with the others, and in which said gain adjusting means comprises an analog to digital converter responsive to said measuring signal for closing a set of said switches selected in accordance with the amplitude of the measuring signal.

9. The apparatus of claim 8, further comprising a digitally controllable attenuator connected in the input circuit of said integrating amplifier, and means controlled by said analog to digital converter for setting said attenuator to a state determined by said measuring signal.

10. The apparatus of claim 3, further comprising function generating means responsive to said product signals for applying an intensity signal to said tube approximating the square root of the sum of the square of said product signals.

11. The apparatus of claim 10, in which said function generating means comprises first and second absolute value networks each producing an output signal in accordance with the absolute value of an applied input signal, means for applying each of said product signals to a different one of said absolute value networks, a maximum absolute value network responsive to the output signal of said absolute value networks for producing an output signal in accordance with the product signal having the largest absolute value, and summing means responsive to the output signals of said first and second absolute value networks and said maximum absolute value network for producing an intensity signal proportional to the sum of said output signals.

12. The apparatus of claim 11, further comprising means for producing a depth cueing signal simulating a third vector component normal to the components resolved by said deflection signals, and means for combining said depth cueing signal with said intensity signal to apply a depth cueing intensity modulation signal to said tube.

13. The apparatus of claim 12, in which said signal combining means comprises function generating means responsive to said depth cueing signal for producing an output signal proportional to an exponential function of said depth cueing signal, and multiplying means responsive to said exponential signal and said intensity signal for producing a depth cueing intensity signal proportional to their product.

14. A depth simulating vector generator, comprising a cathode ray tube, a first integrator having a time constant $\tau_1$, connected to said tube to provide a first deflection signal, a second integrator having a time constant $\tau_2$ connected to said tube to provide a second deflection signal, a third integrator having a time constant $\tau_3$ for producing a third signal, first storage means for storing a signal in accordance with a first deflection signal value, second storage means for storing a second signal in accordance with a second deflection signal value, third storage means for storing a signal in accordance with a vector component normal to those vector components resolved by the deflection signals, means controlled by said first integrator and said first storage means for producing a first difference signal in accordance with the difference between their deflection signals, means controlled by said second integrator and said second storage means for producing a second difference signal in accordance with the difference between their deflection signals, means controlled by said third integrator and said third storage means for producing a third difference signal in accordance with the difference between the stored vector component signal and the output signal of said third integrator, means responsive to said difference signals for producing a measuring signal representative of the length of the vector represented by the difference signals, first multiplying means responsive to said first difference signal and said measuring signal for producing a first product signal equal to $K_1$ times the first difference signal, second multiplying means responsive to said second difference signal and said measuring signal for producing a second product signal equal to $K_2$ times the second difference signal, third multiplying means responsive to said third difference signal and said measuring signal for producing a third product signal equal to $K_3$ times the third difference signal, first switching means closable to connect said first multiplying means to said first integrator, second switching means closable to connect said second multiplying means to said second integrator, third switching means closable to connect said third multiplying means to said third integrator, timing means responsive to said measuring signal for closing said switching means for a time T, where $$\frac{K_1 T}{\tau_1} = \frac{K_2 T}{\tau_2} = \frac{K_3 T}{\tau_3} = 1$$

and circuit means responsive to said third signal from the third integrator for applying an intensity control signal to said tube.

15. The apparatus of claim 14, in which said timing means comprises a counter, a source of pulses selectively operable to step said counter, means for opening said switching means when said counter reaches a predetermined state, means controlled by said measuring signal for presetting said counter to a state which differs from said predetermined state by a number which is a function of the amplitude of said measuring signal, and means for initiating a timing interval by connecting said pulse source to said counter to step said counter toward said predetermined state whereby said switching means are opened after a time interval which is determined by the amplitude of said measuring.

16. The apparatus of claim 14, in which said means for producing a measuring signal comprises comparator means responsive to said difference signals for producing a measuring signal in accordance with the difference signal having the largest absolute value.

17. The apparatus of claim 14, in which said means for producing a measuring signal comprises function generating means responsive to said difference signals for producing a measuring signal proportional to the square root of the sum of their squarer.

18. The apparatus of claim 14, in which each of said multiplying means comprises a variable gain sample and hold network, and means responsive to said measuring signal for adjusting the gain of said sample and hold network to the value $K_i$, where $i=1, 2, 3$.

19. The apparatus of claim 18, in which said variable gain sample and hold network comprises an integrating amplifier having a digitally controllable degenerative feedback network, and in which said gain adjusting means comprises an analog to digital converter responsive to said measuring signal for setting said feedback network to a state selected in dependence on the amplitude of the measuring signal.

20. The apparatus of claim 19, further comprising a digitally controllable attenuator connected in the input circuit of said integrating amplifier, and means controlled by said analog to digital converter for setting said attenuator to a state determined by said measuring signal.

21. The apparatus of claim 14, in which said circuit means comprises function generating means responsive to said first and second product signals for producing an intensity signal at least approximately proportional to the square root of the sum of the squares of said product signals.

22. The apparatus of claim 21, in which said function generating means comprises first and second absolute value networks each producing an output signal in accordance with the absolute value of an applied signal, means for applying each of said first and second product signals to a different one of said absolute value networks, a maximum absolute value network responsive to the output signals of said absolute value networks for producing an output signal in accordance with the product signal having the largest absolute value, summing means responsive to the output signals of said first and second absolute value networks and said maximum absolute value network for producing a control signal, and second circuit means responsive to said control signal and said third signal for producing an intensity signal that is a predetermined function of said third signal and said control signal.

23. The apparatus of claim 22, in which said second circuit means comprises function generating means responsive to said third signal for producing an output signal proportional to an exponential function of said third signal, and multiplying means responsive to said exponential signal and said control signal for producing a depth cueing intensity signal proportional to their product.

24. In combination, a cathode ray tube responsive to two applied deflection signals and an applied intensity signal to produce an electron beam causing a light spot to appear on the tube at a location determined by said deflection signals and with an intensity determined both by said intensity signal and by the rate at which said deflection signals are changed, means for storing deflection signals corresponding to the current position of said beam, means for producing a depth signal corresponding to a distance normal to the coordinates represented by said deflection signals, function generating means responsive to said depth signal for producing an output signal that is an exponential function of said depth signal, signal generating means controlled by said storage means and responsive to two applied deflection signals corresponding to a new position of the beam and also to said output signal for producing an intensity signal in accordance with both the distance between the current position and the new position of the beam and said depth signal and means for applying said intensity signal to said tube thereby to simulate a three dimensional display.

25. The combination defined in claim 24 in which said function generator includes means for causing said output signal to blank said cathode ray tube when said depth signal assumes a value indicating a position in front of the face of said cathode ray tube.

References Cited
UNITED STATES PATENTS

| | | | |
|---|---|---|---|
| 3,205,344 | 9/1965 | Taylor et al. | 340—324 X |
| 3,394,367 | 7/1968 | Dye | 340—324 |
| 3,430,207 | 2/1969 | Davis | 340—324 X |

RICHARD A. FARLEY, Primary Examiner

T. H. TUBBESING, Assistant Examiner

U.S. Cl. X.R.

315—18; 340—324

PO-1050
(5/69)

UNITED STATES PATENT OFFICE
CERTIFICATE OF CORRECTION

Patent No. 3,539,860          Dated November 10, 1970

Inventor(s) Solomon M. Max and John B. Porter

It is certified that error appears in the above-identified patent and that said Letters Patent are hereby corrected as shown below:

Column 1, line 58, "function" should be --functions--;
Column 2, line 21, "coordinate" should be --coordinates--
Column 4, line 48, "and" should be --an--;
Column 5, line 29, "displacement" should be --displacemen
Column 6, at the beginning of line 60 "the MOVE" should b --the MOVE--;
Column 6, line 61, "MOVE" should be --MOVE--;
and on the same line, before "logic" insert --is--;
Column 7, line 28, "timing" should be --trimming--;
Column 9, at the end of line 59 and the beginning of line "protential" should be --potential--;
Column 11, line 9, after "R23" "ad" should be --and--;
Column 11, line 17, "vetcors" should be --vectors--;
Column 11, line 30, after "of" delete "the";
Column 14, line 56, between equations (13) and (14), insert --or from (9)--;
Column 18, line 36, claim 15, after "state" insert --and for simultaneously closing said switching means--; and on line 38, after "measuring" and before the period, insert --signal--.

SIGNED AND
SEALED
MAR 9 1971

(SEAL)
Attest:

Edward M. Fletcher, Jr.
Attesting Officer

WILLIAM E. SCHUYLER,
Commissioner of Pat